July 27, 1943. D. E. IRONS 2,325,404
THRUST BEARING ARRANGEMENT
Filed Dec. 18, 1941

Inventor:
Davison E. Irons,
by Harry E. Dunham
His Attorney.

Patented July 27, 1943

2,325,404

UNITED STATES PATENT OFFICE 2,325,404

THRUST BEARING ARRANGEMENT

Davison E. Irons, Marblehead, Mass., assignor to General Electric Company, a corporation of New York Application December 18, 1941, Serial No. 423,497

7 Claims. (Cl. 308—163)

The present invention relates to thrust bearing arrangements such as are used for supporting elastic fluid turbine shafts which are subject to horizontal thrust, though it is not limited thereto necessarily. These bearings during operation may be subject to excessive shock loads of relatively short duration caused, for example, by water slugs entering a turbine and directed with considerable force against the rotor buckets. Normal thrust loads can be handled satisfactorily with a comparatively small thrust bearing. In order to carry excessive overloads, which may be several times the normal load, it would be necessary to provide a bearing of considerable size to keep the unit loading within safe limits. Such large size bearings, however, cause a considerable increase in frictional loss which is undesirable.

The object of my invention is to provide an improved construction of thrust bearing arrangements in which the bearing losses are kept at a minimum during normal operating conditions and which may carry considerable overload.

This is accomplished in accordance with my invention by the provision of a yieldably supported main thrust plate engaging a thrust collar on a shaft to take up the normal thrust and an auxiliary thrust plate which is normally spaced from the thrust collar and engaged by the latter only after the yieldable support thrust plate has been moved axially a certain distance. In such arrangement the auxiliary thrust plate is put in operation only upon the occurrence of excessive loads.

For a better understanding of what I believe to be novel and my invention, attention is directed to the following description and the claims appended thereto in connection with the accompanying drawing.

Figure 1:
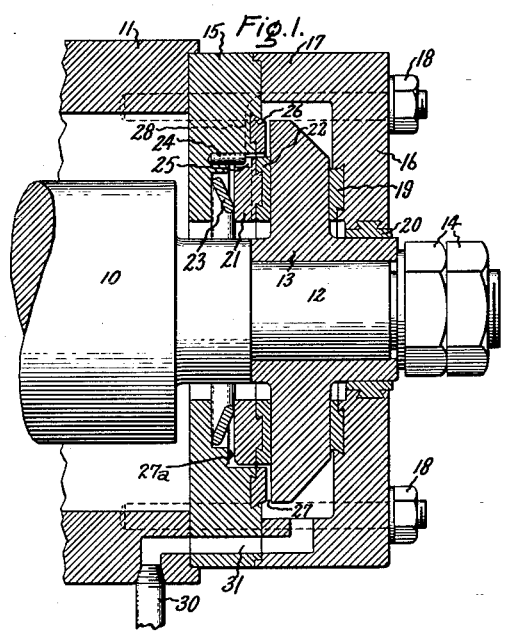
Figure 2:
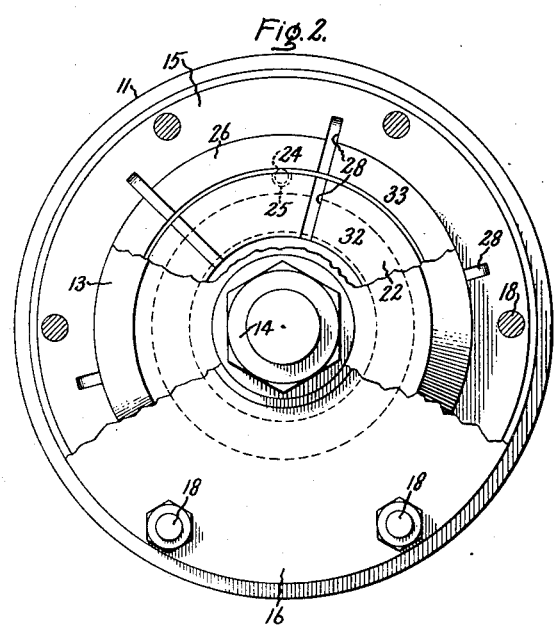

In the drawing Fig. 1 illustrates a sectional view of a thrust bearing arrangement embodying my invention, and Fig. 2 is a front view of Fig. 1 partly broken away.

The thrust bearing arrangement shown in the drawing comprises a shaft 10 located within a casing 11 and having an extension 12 with a thrust collar 13 securely fastened thereto by means including nuts 14. The thrust collar 13 is engaged by a thrust plate structure which includes active thrust plate means including a ring or plate 15 located on the left-hand side of the thrust collar 13 and an inactive thrust plate 16 adjacent the right-hand side of the thrust collar 13. The plate 16 has a cylindrical extension 17 rabbeted to an outer portion of the plate 15 and securely fastened to the latter and to the casing 11 by a plurality of circumferentially spaced bolts 18. The inactive thrust plate 16 which normally is not subjected to thrust forces is provided with a bearing lining 19 in cooperative relation with the thrust collar.

The plate 16 has a central opening through which the shaft end projects. A suitable packing 20 supported on the plate 16 and in cooperative relation with a cylindrical extension of the thrust collar 13 is provided to reduce leakage of lubricant from the bearing arrangement.

The active thrust plate means 15 includes a first or main thrust ring 21 provided with a lining 22 adjacent the thrust collar 13. This ring 21 is disposed within a recess of the plate 15 and yieldingly supported by spring means. This spring means is in the form of a conically-shaped ring 23 which at one end engages the plate 15 and at the other end the ring 21. Rotary movement of the ring 21 is prevented or limited by a pin 24 held in the plate 15 and projecting into an opening 25 of the ring 21.

The active thrust plate means includes a second ring, in the present instance formed by a portion of the plate or ring 15, which is provided with a bearing lining 26 adjacent an outer portion of the thrust collar 13. The ring 15 and the lining 26 which together constitute an auxiliary support or second thrust plate or ring are axially spaced from the adjacent face of the thrust collar 13 more than the spacing between the main ring 21 from the thrust collar 13. For example, the clearance between the bearing surface of the lining 22 and the adjacent surface of the thrust collar 13 may be of the order of .002 inch while a clearance 27 of the order of .008 inch is maintained between the bearing surface of the lining 26 and the adjacent surface of the thrust collar 13. With this arrangement the normal thrust load is carried by the main thrust ring or plate 21 of the active thrust plate means. Upon the occurrence of sudden considerable overloads the shaft 10 is forced to the left, thereby compressing the spring means or yieldable ring 23 until a certain load is reached at which the main thrust ring or plate 21 is forced against a solid seat 27a formed by the plate 15 and the outer portion of the thrust collar 13 engages the second or auxiliary thrust plate or ring 15 with its lining 26. With the thrust ring 21 against its seat 27a, the linings 22 and 26 will be in axial alignment with each other. Any additional load is then carried by the auxiliary thrust ring and the main thrust ring together acting as one plate with an area equal to the combined area of the separate rings.

The active thrust rings with their linings 22, 26 are provided with a plurality of circumferentially spaced radial grooves 28 which are preferably machined into these elements after the ring 21 is assembled within the plate 15. In order to assure uniform depth of the grooves 28 in both thrust rings, the ring 21 during the process of manufacture is held within the recess of the plate 15 in engagement with the rigid slot 27a so that the bearing surface of the lining 22 is in a plane with that of the lining 26.

Lubricant is supplied to the bearing surfaces by a lubricating system which may include a supply pipe 30 and channels 31 formed in the support casing 11 and the plates 15, 16. The grooves 28 form a plurality of circumferentially spaced lands 32 and 33 on the two concentrically spaced active thrust rings, which lands may be tapered in known manner in cirumferential direction.

Thus, with my invention I have provided an improved construction for thrust bearing arrangements whereby the normal thrust load is carried by a comparatively small main thrust ring and excess loads are carried on the combined area of the main thrust ring and an auxiliary thrust ring or plate. In this manner a thrust bearing may be operated safely and at high efficiency.

What I claim as new and desire to secure by Letters Patent of the United States, is:

1. Axial thrust bearing arrangement comprising a shaft with a thrust collar secured thereto, a support, and active thrust plate means held on the support and including a main thrust ring for normally engaging the collar, yieldable means biasing the ring towards the thrust collar and an auxiliary thrust ring normally spaced from the thrust collar for engaging and assisting in supporting the latter during excess load conditions only and after the yieldable means has been deformed a predetermined amount.

2. Axial thrust bearing arrangement comprising a shaft with a thrust collar, and active and inactive thrust plate means engaging opposite sides of the collar and secured to the support, the active thrust plate means including concentrically spaced rings with bearing linings, means yieldably supporting one of the rings and biasing it towards the thrust collar, the other ring being normally axially spaced from a portion of the thrust collar for engaging the latter only during excess load conditions after the yieldable supporting means has been deformed a certain amount.

3. Axial thrust bearing arrangement comprising a shaft with a thrust collar, and active and inactive thrust plate means engaging opposite sides of the collar and secured to the support, the active thrust plate means including concentrically spaced main and auxiliary thrust rings with bearing linings, means yieldably supporting the main ring and biasing it towards the thrust collar, the auxiliary ring being normally axially spaced from a portion of the thrust collar and engaging the latter only during excess load conditions, and means preventing relative angular movement between the rings.

4. Axial thrust bearing arrangement comprising a shaft with a thrust collar, a support, a thrust plate secured to the support and having an annular recess surrounding the shaft, a main thrust ring located in the recess, spring means engaging the ring and the plate in the recess to bias the ring towards the thrust collar, and an auxiliary thrust ring formed by the plate and having a lining adjacent the thrust collar and normally spaced therefrom for taking up excess thrust load after the first mentioned ring has been moved a predetermined amount axially against the biasing force of said spring means.

5. Axial thrust bearing arrangement comprising a shaft with a thrust collar, a support, a thrust plate secured to the support and having an annular recess surrounding the shaft, a thrust ring located in the recess, a conical flexible ring between the plate and the ring to force the latter towards the thrust collar, and an auxiliary fixed support including a bearing lining in the plate, said lining being normally spaced from the adjacent surface of the thrust collar for engaging the latter upon excess load on the bearing.

6. Axial thrust plate arrangement comprising a plate having an annular recess, a ring with a bearing lining disposed within the recess, spring means between the plate and the ring, and an auxiliary thrust ring including a portion of the plate and a bearing lining thereon, the bearing face of said lining being normally axially spaced from the bearing face of the ring.

7. Axial thrust bearing arrangement comprising a shaft with a thrust collar secured thereto, a support, a main thrust ring and yieldable means between the main thrust ring and the support for carrying the normal thrust load, a rigid seat formed on the support for limiting deformation of the spring means, and auxiliary thrust ring means normally forming a clearance with a portion of the collar and engaging the collar upon the main thrust ring engaging said rigid seat to carry together with the main thrust ring excessive loads.

DAVISON E. IRONS.